Oct. 27, 1959 L. H. BARENS 2,909,966
CONTOUR OR SPIRAL MILLING DEVICE
Filed July 12, 1956 3 Sheets-Sheet 1

LEONARD H. BARENS,
INVENTOR.

BY John H. G. Wallace

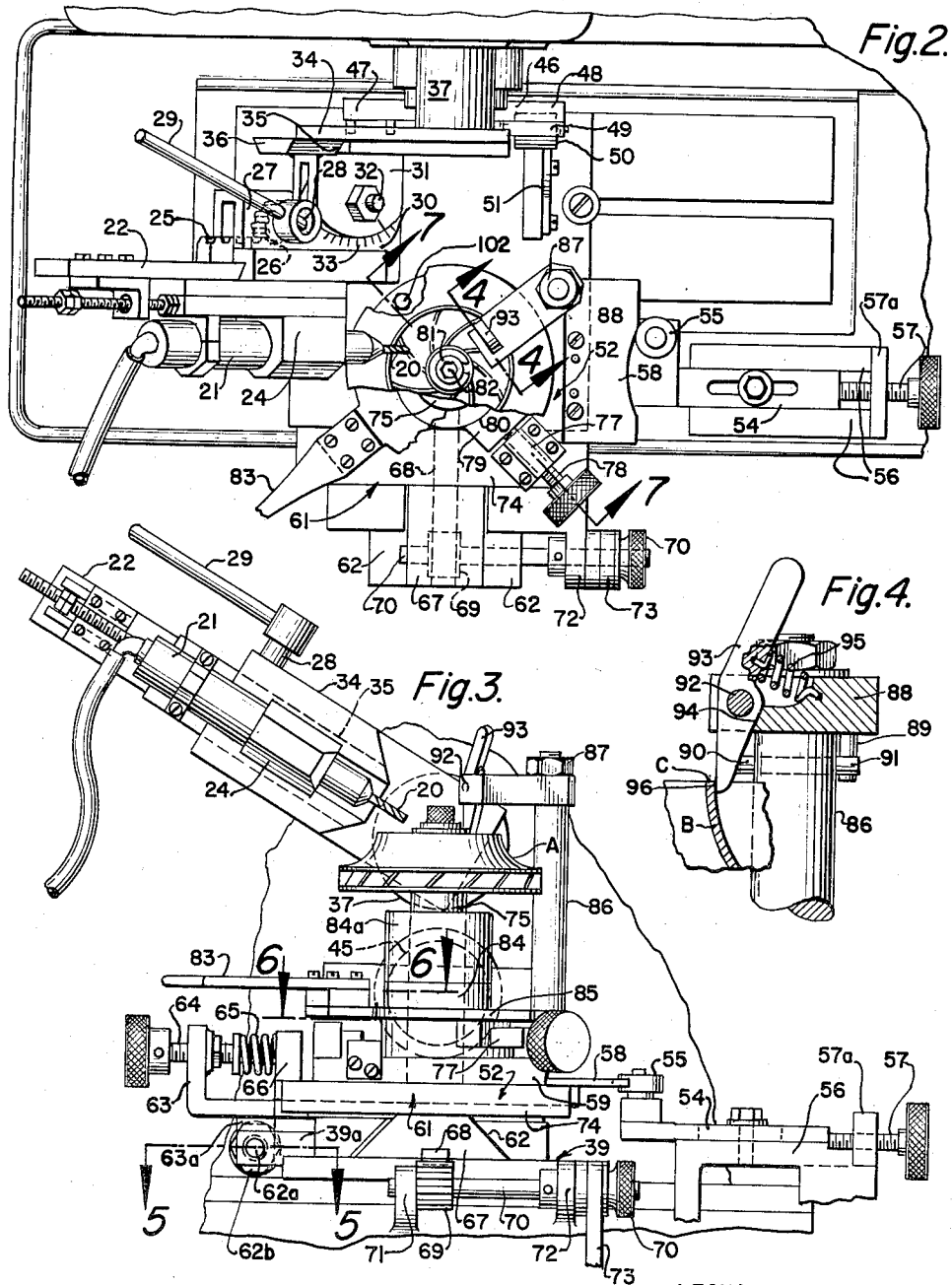

Oct. 27, 1959
L. H. BARENS
2,909,966
CONTOUR OR SPIRAL MILLING DEVICE
Filed July 12, 1956
3 Sheets-Sheet 3
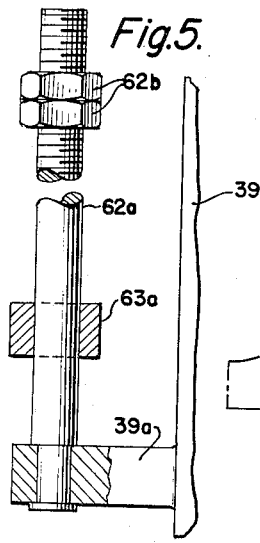
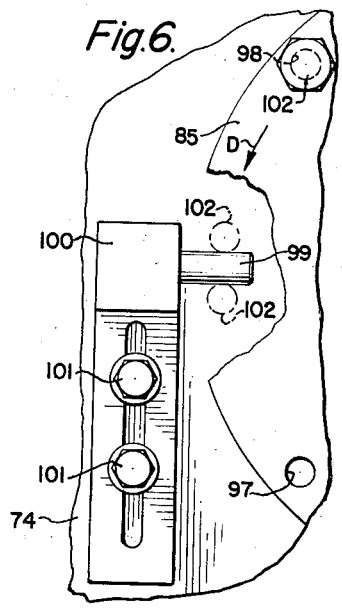
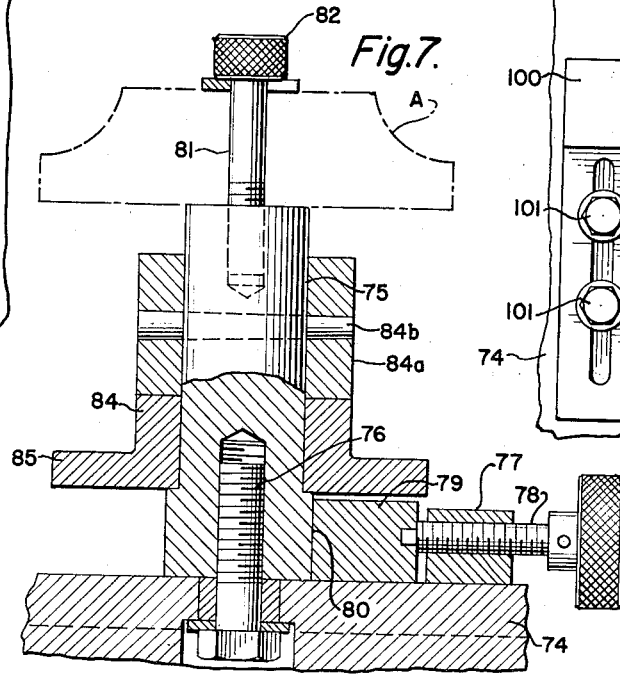
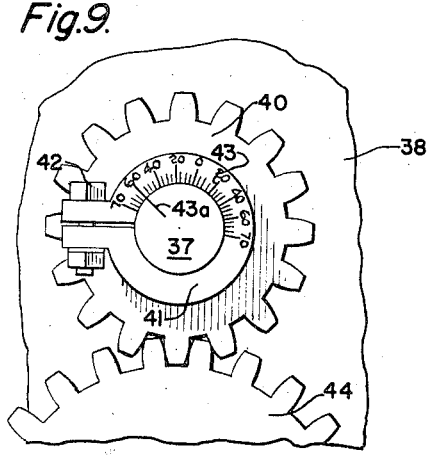
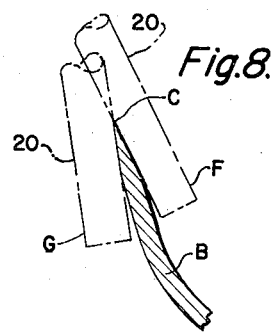
LEONARD H. BARENS,
INVENTOR.
BY John H. J. Wallace

United States Patent Office 2,909,966
Patented Oct. 27, 1959

2,909,966

CONTOUR OR SPIRAL MILLING DEVICE

Leonard H. Barens, Phoenix, Ariz., assignor to The Garrett Corporation, Los Angeles, Calif., a corporation of California Application July 12, 1956, Serial No. 597,519

7 Claims. (Cl. 90—13)

This invention relates to an impeller machining device and more particularly to a machining device for finishing the inlet edges of impeller blades.

In the manufacture of shrouded impellers, it is feasible to cast the shrouds integral with the blades whereby the impellers may readily be produced in an economical fashion. Casting of the impellers imposes certain limitations on the finishing of the impeller blade passages and also on the shaping of the impeller blades at their inlet edges.

The inlet edges of finished impeller blades are generally of a suitable aerodynamic apex shape. Since it is not usually feasible to cast thin, sharp, apex edges integral with the inlet portions of the impeller blades, it has been found necessary to finish these blade inlet edges. In the past the inlet edges have been finished by hand which results in nonuniformity between the various blades of an impeller, and in addition, greatly increases the cost of the finished impeller.

In addition, when machines have been built for the purpose, it has been difficult to index the inlet edges of the blades of a cast impeller so that a machine tool cutter will accurately machine with respect to the middle of the blade edges. Indexing heads used on various machines are not compatible with slight variations in the spacing of impeller blades which may be caused by inaccurate machining of the blade proper or by slight core slippage during a casting process.

Accordingly, it is an object of the present invention to provide a blade machining device which will accurately index and machine the inlet edges of impeller blades regardless of slight variations in the spacing thereof.

Another object of the invention is to provide a blade machining device which is very simple and easy to set up and operate.

Another object of the invention is to provide a blade machining device which may very readily and easily be set up to machine the inlet edges of impellers which operate in either a clockwise or counter-clockwise direction.

Another object of the invention is to provide a blade machining device in which contour templates are readily and easily changed, in order to adapt the device to the machining of a variety of impellers having different blade configurations.

A further object of the invention is to provide a blade machining device which is particularly adapted to machine the inlet edges of skew bladed impellers.

An additional object of the invention is to provide a blade machining device which is very simple and economical of construction compared to the complex machining operation which it performs.

Further objects and advantages of the invention will be apparent from the following specification, appended claims and accompanying drawings, in which:

Fig. 2 is a fragmentary top or plan view thereof;

Fig. 3 is a fragmentary front elevational view thereof;

Fig. 4 is an enlarged fragmentary sectional view taken from the line 4—4 of Fig. 2 and showing details of the impeller blade indexing features of the machine;

Fig. 5 is an enlarged fragmentary sectional view taken from the line 5—5 of Fig. 3, showing a carriage stop mechanism;

Fig. 6 is an enlarged fragmentary view taken from the line 6—6 of Fig. 3, showing indexing stop mechanism of the blade machining device with a portion removed for clarity;

Fig. 7 is an enlarged fragmentary sectional view taken from the line 7—7 of Fig. 2, showing features of the impeller support and indexing mechanism;

Fig. 8 is a fragmentary sectional view of the inlet edge of an impeller blade and illustrating by broken lines relative operating positions of the cutter of the blade machining device;

Fig. 9 is an enlarged fragmentary rear elevational view of the machining device taken form the line 9—9 of Fig. 1, showing a protractor means for setting the cutter to various blade edge machining positions, as indicated by broken lines in Fig. 8 of the drawings.

Figure 1:
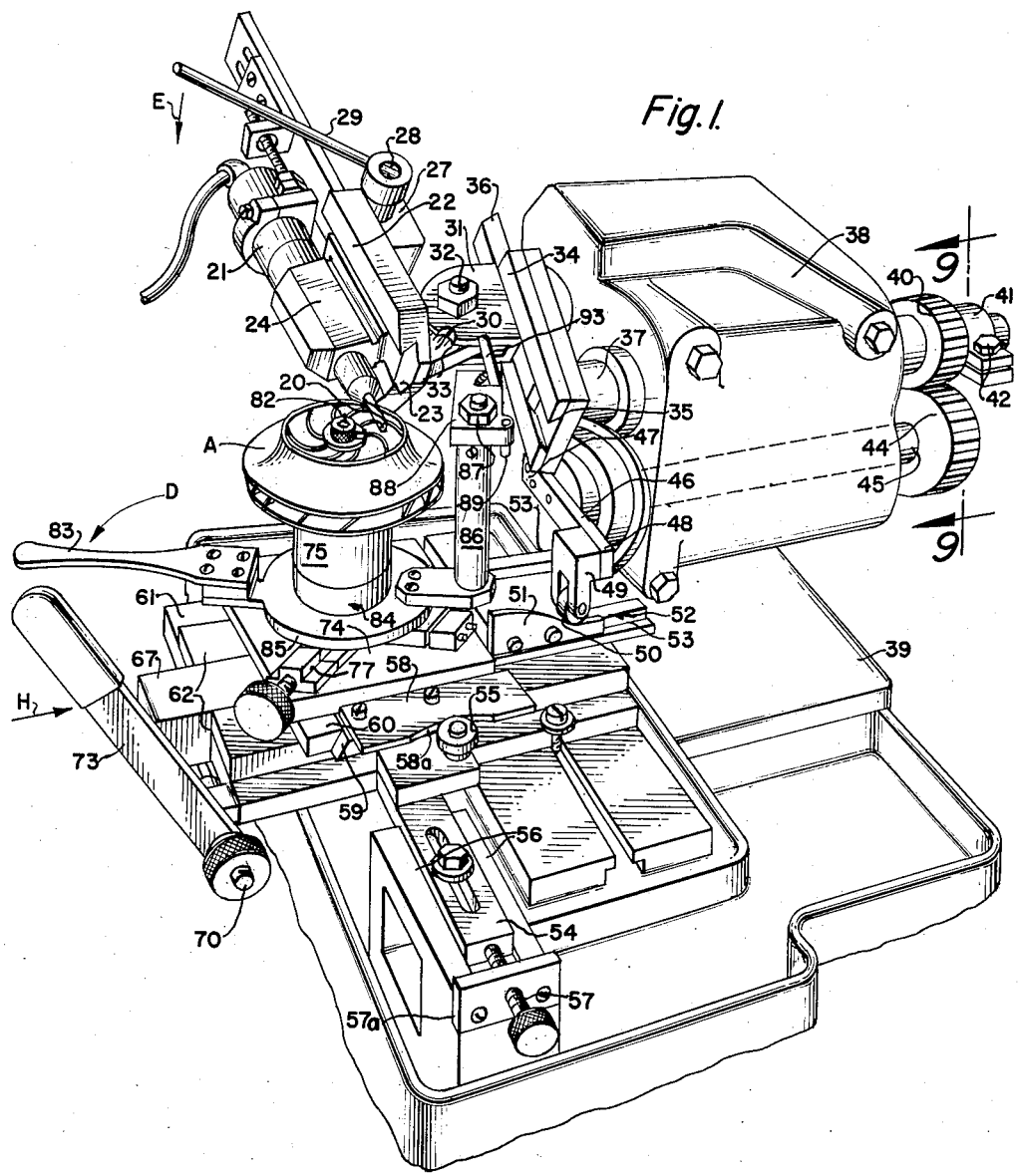
Figure 1 is a perspective view of a blade machining device constructed according to the present invention.

The blade machining device of the present invention, as shown in Figs. 1, 2, 3 and 9 of the drawings, is provided with a blade machining cutter 20, having a driving motor 21 supported on slideways 22. The slideways 22 are provided with a dovetail shaped slot 23 in which the base 24 of the motor 21 is slidably mounted. Projecting through the slideways 22 and integral with the base 24 is a gear rack 25, meshing with a pinion 26 which is pivotally mounted in a bearing frame 27 projecting from the rear of slideways 22. Connected with the pinion 26 is a shaft 28, having an arm 29 affixed thereto at a right angle to the axis of rotation of the pinion. This arm 29, when moved about the axis of the shaft 28, causes the pinion 26 to rotate, thus moving the rack 25 so as to slide the frame 24 of the motor 21 in the dovetail slot 23 of the slideways 22 in a direction parallel with the axis of the cutter 20.

The slideways 22 are provided with a bracket 30 which projects from the rear of the slideways. The bracket 30 projects into a U-shaped bracket 31 and is pivotally connected thereto by a bolt 32 which passes through both brackets. Brackets 30 and 31 are oriented by means of a protractor scale 33 so that the axis of cutter 20 may be at any desired angle, as will be hereinafter described in detail. The bracket 31 is adjustably fixed in a second set of slideways 34 which are provided with a dovetail slot 35 fixedly supporting the base 36 of the bracket 31. The slideways 34 are attached to a shaft 37, which projects at right angles from the rear of the slideways. The shaft 37 is pivotally mounted in a spindle head 38 carried by a base frame 39 of the blade machining device.

Adjustably connected to the end of the shaft 37, opposite the slideways 34, is a gear 40. The gear 40 is provided with a clamp element 41 shown in detail in Fig. 9 of the drawings. The clamp element 41 is a split ring type of clamp having a bolt 42 adapted to be tightened for fixing the gear 40 on the shaft 37. A protractor scale 43 is located on the clamp 41, and an indexing mark 43a is located on the end of shaft 37 for precisely setting any desired axial angle of the cutter 20 with respect to its work, as will be hereinafter described in detail. The gear 40 meshes with a second gear 44 secured to one end of a shaft 45, which is journaled in the spindle head 38 so that its axis is parallel with the axis of shaft 37. Fixed to the opposite end of the shaft 45 is a cam follower bar 46, having bolt holes in its opposite ends 47 and 48 for receiving bolts so that a cam follower bracket 49 may be attached to either end. Bolt holes in opposite ends 47 and 48 of the bar 46 permit the cam follower bracket 49 to be attached to either end of the bar, in accordance with a setup of the device for machining inlet edges of impeller blades which are adapted to rotate either in a clockwise or counter-clockwise direction. The bracket 49 is provided with a roller 50 which is adapted to engage a cam 51 secured to one side 53 of a carriage 52. The carriage 52 is mounted on the frame 39 so that it may be moved in two directions in a horizontal plane as will be described later. The roller 50 is of sufficient width so that it will remain engaged with the cam 51 when the carriage 52 is moved in a direction parallel with the axis of the roller. When the cam 51 is fixed to the side 53 of the carriage 52, it may be arranged to cooperate with the roller 50 when the bracket 49 is connected to the end 47 of the bar 46 as shown in Fig. 1.

Adjustably connected to the frame 39 is a bracket 54 which supports a cam engaging roller 55 and is supported on the base 39 in slideways 56. An adjustable screw 57, which is supported in a stationary bracket 57a, engages one end of the bracket 54 for adjusting the lateral position of the roller 55 with respect to a cam plate 58 on the carriage 52. The carriage 52 is provided with a dovetail slide plate 59, which is slidably mounted in slideways 60 attached to a second carriage 61. This allows the carriage 52 to move in a direction perpendicular to the axis of the shafts 37 and 45 in a horizontal plane. The second carriage 61 is mounted in a pair of slideways 62, which are formed in the frame 39 at right angles to the slideways 60, so as to allow the carriage 61 to move in a direction parallel to the axis of the shafts 37 and 45 in a horizontal plane. Thus, the carriage 52, supported on its dovetail plate 59 and the slideways 60, is movable by the cam 58 in engagement with the stationarily supported roller 55, when the second carriage 61 moves on the slideways 62 in a direction parallel to the axis of the shafts 37 and 45. A bracket 63 shown in Fig. 3 is fixed to the carriage 61 and supports an adjustable screw 64, which is arranged to adjust the tension of a spring 65. The spring 65 engages a bracket 66 projecting vertically from the carriage 52, thus tending to urge the carriage in a direction toward the roller 55 so as to maintain the cam plate 58 in engagement with the roller 55.

The bracket 63 is provided with a downwardly extending arm 63a which slides on a fixed rod 62a. The rod 62a is supported at one end by a bracket 39 and has its opposite end threaded as shown in Fig. 5. Stop nuts 62b are adjustably positioned on the threaded end of rod 62a for limiting the movement of the arm 63a so that movement of the carriage 61 may be limited to the length of the contour surface 58a of the cam 58.

The bottom of the second carriage 61 is provided with a dovetail plate 67 which engages the slideways 62. Affixed to the plate 67 is a downwardly extending gear rack 68, which meshes with a pinion 69 secured to a shaft 70. The shaft is rotatably mounted in two ears 71 and 72 projecting from the frame 39. A lever 73 is affixed to the shaft 70 for rotating the same, whereby the pinion 69 in mesh with the rack 68 will move the carriage 61 relative to the slideways 62. The carriage 52 is provided with a carriage plate 74 superimposed on the dovetail plate 59 and serving as a support for an impeller holder 75. The impeller holder 75 is provided with a bearing bolt 76 extending through the plate 74 and having a substantially vertical axis about which the impeller holder 75 may rotate, as shown in Fig. 7. Mounted on the plate 74 is a nut 77 having a screw 78, which is provided with a knurled head, threaded therein. The screw 78 engages a block 79 which bears upon a locking surface 80 of the impeller holder 75 for fixing the same in any desired position relative to the plate 74. The upper end of the holder 75 is provided with a stud 81, on which an impeller, as shown by broken lines A, may be mounted. A nut 82 on the upper end of the stud 81 is provided for clamping an impeller A firmly against the upper surface of the holder 75. A sleeve 84, which has an outwardly extending shoulder at its lower end, is pivotally mounted on the holder 75. The sleeve 84 is retained on the holder 75 by a collar 84a which is locked in place by a tapered pin 84b which passes through the holder 75. As shown in Fig. 1, an extending arm 83 is attached to the flange 85 for rotating the sleeve 84 to index the impeller.

An upwardly extending index post 86 is also attached to the flange 85 opposite the indexing arm and has a bar 88 pivotally mounted on its upper end. The bar 88 is provided with a stop pin 89, which engages diametrically opposed pins 90 and 91 carried by the post 86 as shown in Fig. 4. Pivoted on the bar 88 by means of a pin 92 is a pawl 93 which engages a stop portion 94 on the bar 88 and is normally held in engagement therewith by means of a spring 95. The pawl 93 is provided with a blade engagement surface 96, which is engageable with an impeller blade B near its inlet edge C previous to the machining thereof by the cutter 20.

Referring to Fig. 6, it will be seen that the flange 85 is provided with openings 97 and 98 arranged to receive a stop bolt 102. The stop bolt is adapted to engage a pin 99 supported by a bracket 100, which is adjustably secured to the carriage plate 74 by means of a pair of cap screws 101. As shown in Fig. 6, the stop bolt 102 is shown positioned in the opening 98 and is arranged to limit pivotal movement of the index arm 83 in the direction of the arrows D in Figs. 1 and 6 of the drawings. The stop pin 99 is so adjusted that the bolt 102, when it contacts the pin, will limit movement of the index arm 83, post 86 and pawl 93 to a position required for properly indexing the blade of the impeller wheel. The blade B, as shown in Fig. 4, when moved into engagement with the pawl 93, will then be in position to be machined by the cutter 20.

The operation of the blade machining device, in accordance with the present invention, is substantially as follows:

Preparatory to machining of impeller blade inlet edges by the device of the present invention, the cutter 20, as shown by broken lines on Fig. 8 of the drawings, must be set at a predetermined angle according to the desired aerodynamic configuration of the inlet edges of the impeller blades. With the roller 50 fully engaging the cam 51, the axis of cutter 20 is set at the desired angle by means of the protractor 43 on the clamp 41 at the end of shaft 37. The protractor 43 provides for angular adjustment of the gear 40 relative to an index mark 43a on the shaft 37. When the index mark 43a is located at the desired angle with respect to the protractor 43 the bolt 42 is tightened, which fixes the gear 40 on the shaft 37. Engagement of the roller 50 with the cam 51 maintains the axis of the cutter 20 at the proper angle for machining one side of each of the blade inlet edges of an impeller A, as shown best in Fig. 1 of the drawing. The impeller A is clamped to the impeller holder 75 by means of the stud 81 and nut 82. The arm 83 when moved causes the stop bolt 102 in the opening 98, as shown in Fig. 6 of the drawings, to engage the stop pin 99. The pawl 93 is thus located to index one of the blades B in machining position, as will be hereinafter described.

The lever 29 is then moved in the direction of the arrow E, on Fig. 1 of the drawing, which projects the cutter 20 past the edge of the blade B, which is indexed, as shown in Fig. 4 of the drawings.

The adjustment screw 57 is then adjusted to permit the roller 55 to be retracted away from the cam 58, whereupon the spring 65 forces the carriage 52 to slide on the slideways 60 toward the roller 55, whereby the cam 58 is maintained in engagement with the roller 55. This adjustment of the screw 57 permits the carriage 52 to carry the impeller A on the holder 75 to a position in which the periphery of the cutter 20 intersects the middle portion C of one of the blades B of the impeller, as shown in Fig. 8 of the drawing.

The angular disposition of the cutter 20, as shown in Fig. 1 of the drawing, is illustrated by broken lines F in Fig. 8 of the drawing. The position of the cutter 20, as shown by broken lines G in Fig. 8, represents the disposition of the cutter when it is set up to machine the opposite sides of the inlet edges of the impeller A. As hereinbefore described, the roller bracket 49 and the cam 51 may be connected with the end 47 of the arm 46 and the side 53 of the carriage 52, respectively, when it is desired to machine the inlet edges of impeller blades having curvature opposite to that of the impeller A, as shown in Fig. 1 of the drawings.

In the interests of productive economy, the impeller machining device is first set up to machine only one side of each impeller blade at its inlet edge, and while the machine is so set up, a large number of impellers may be machined. The angle of the cutter 20, for example, may then be changed from its position F to its posistion G, by adjusting the shaft 37 relative to the gear 40 in accordance with the protractor 43 and index 43a, as hereinbefore described. All of the impellers may then be successively machined at the inlet edges of the blades in accordance with the setting of the cutter 20 in the broken line position G. This mode of operation permits successive machining of opposite sides of the impeller blades at their edges C, while maintaining the same setting of the roller 50 and cam 51. This is preferred in the machining of impellers which rotate either in a clockwise or counter-clockwise direction.

It will be noted that the contoured surface 58a of the cam 58 is concave for use in following the curvature of the blades of the impeller A, while the contoured surface 58a may be convex for the machining of oppositely curved blades of an impeller designed to rotate in the opposite direction from that of the impeller A.

During the operation of the device individual impeller blades are indexed by moving the edge 96 of the pawl 93 into engagement with the impeller blade B and shifting the lever 83 in the direction of arrow D until the bolt 102 engages the stop pin 99. The lever 83 is then held to insure engagement of the bolt 102 with the stop pin 99, during which time the block 79 is locked against the holder 75 by tightening of the screw 78 precisely to hold an indexed position of the impeller A. After the impeller is thus indexed relative to the cutter 20, the bar 88 is pivoted on the bolt 87 in a direction to disengage the pawl from the indexed blade of the impeller. The pawl 93 is then pivoted about the axis of the pin 92, against compression of the spring 95, until the end 96 of the pawl clears the indexed impeller blade. The bar 88 and pawl 93 are then pivoted on the bolt 86 to a position as shown in Fig. 1, wherein they are out of the machining path of the cutter 20. The cutter 20 is then moved axially of itself by means of the lever 29 when actuated in the direction of arrow E, during which time the motor 21 rotates the cutter 20 at high speed. The cutter thus projects itself through a portion of the blade edge on one side of the desired inlet edge apex C, as shown in Fig. 8 of the drawings. The lever 73 is then raised, causing the gear 69 to propel the rack 68 and carriage 61 together with the carriage 52 in the direction of the arrow H, as shown in Fig. 1 of the drawings. When the lever is thus moved, corresponding movement of the carriage 61 causes concurrent operation of the cams 51 and 58. The cam 51 causes the roller 50 to rotate the shafts 37 and 45, whereby the angle of the cutter 20 is constantly changed with respect to the horizontal, while the carriage 52, supporting the impeller A, moves laterally between the roller 55 and the spring 65. During movement of the carriage 61 in the direction of the arrow H, the axis of the impeller A is moved toward the cutter, whereby relative movement of the cutter is from the outer radially extending extremities of the impeller blade inlet edges toward the hub of the impeller. During this relative movement the axial angle of the cutter 20 changes with respect to the horizontal, and the carriage 52 moves substantially at a right angle to the axis of the shaft 37, about which the axial angle of the cutter 20 changes. It will be understood that the axis of the shaft 37 intersects the cutter 20, which permits the axial angle of cutter 20 to be changed without being displaced relative to the desired apex C at the edge of a blade being machined. When the blade has been machined from the outer shroud of the impeller A to the hub portion, the cutter 20 is then retracted by moving the lever 29 in a direction opposite to the arrow E of Fig. 1 of the drawings. The cutter 20 then clears the impeller and permits the pawl 93 and bar 88 to be pivoted around the axis of the bolt 87 into a position above the impeller, as shown in Fig. 4. The lever 83 is moved in a direction opposite to the arrow D in Fig. 1 of the drawings, whereby the bolt 102 is moved away from the stop pin 99, shown in Fig. 6 of the drawings, permitting the pawl 93 to be engaged with the next successive blade B. The screw 78 is then loosened, thereby releasing the locking block 79 to permit indexing rotation of the impeller holder 75. The lever 83 is then moved in the direction of the arrow D until the bolt 102 again engages the stop pin 99, whereupon the screw 78 is tightened, fixing the block 79 in engagement with the surface 80 of the holder 75, which retains the impeller A in fixed position during the machining of said next successive blade. The cutter 20 is then operated as hereinbefore described for machining all of the successive inlet edge portions of the impeller blades in a similar manner to that previously described.

It is desired to emphasize the fact that various modifications may be made in the present invention without departing from the broad spirit and scope of this invention.

I claim:

1. Apparatus for machining the edges of a curved skewed blade comprising: a cutter mounted for rotation about a first axis; means for rotating said cutter; means supporting said cutter for rocking movement about a second axis intersecting said first axis; blade supporting means for holding a curved blade with a point on the edge thereof initially in a predetermined position relative to said second axis, said blade supporting means being movable in a first direction parallel to said second axis and a second direction at right angles thereto; means for simultaneously moving said blade supporting means in said directions to dispose successive points on said blade edge in said predetermined position; and means for moving said cutter supporting means to rock said cutter about said second axis as the blade supporting means is moved to substantially maintain a predetermined angular relationship between said cutter and the blade.

2. Apparatus for machining the edge of a curved skewed blade comprising: a cutter mounted for rotation about a first axis; means for rotating said cutter; means supporting said cutter for axial movement and rocking movement about a second axis intersecting said first axis; blade supporting means for holding a curved blade with a point on the edge thereof initially in a predetermined position relative to said second axis, said blade supporting means being movable in two directions at right angles to one another in a plane parallel to said second axis; means for simultaneously moving said blade supporting means in said directions to dispose successive points on said blade edge in said predetermined position; and means for moving said cutter supporting means to rock said cutter about said second axis as the blade supporting means is moved to substantially maintain a predetermined angular relationship between said cutter and the blade.

3. Apparatus for machining the edge of a curved skewed blade comprising: a cutter mounted for rotation about a first axis; means for rotating said cutter; means supporting said cutter for rocking movement about a second axis intersecting said first axis; blade supporting means for holding a curved blade with a point on the edge thereof initially in a predetermined position relative to said second axis, said blade supporting means being movable in two directions in a plane parallel to said second axis; means for simultaneously moving said blade supporting means in said directions to dispose successive points on the edge of the blade in said predetermined position; and motion transmitting means operatively connecting said blade supporting means and said cutter supporting means, movement of the former causing the latter to rock said cutter about said second axis to substantially maintain a predetermined angular relationship between said cutter and the blade.

4. Apparatus for machining the edge of a curved skewed blade comprising: a cutter mounted for rotation about an axis; means for rotating said cutter; supporting means for holding a curved blade with a selected point on the edge thereof in a predetermined position relative to said cutter, said blade supporting means being movable in two directions in the same plane to effect the longitudinal traverse of the blade by said cutter; means for moving said blade supporting means in said two directions; means supporting said cutter for movement in a plane substantially perpendicular to a blade in said blade supporting means; and means for moving said cutter simultaneously with the movement of said blade supporting means to maintain the angular relationship between said cutter and the blade.

5. Apparatus for machining the edges of curved skewed impeller blades comprising: a cutter mounted for rotation about an axis; means for rotating said cutter; supporting means for holding an impeller having curved skewed blades with the axis of the impeller in a predetermined position; means for positioning an impeller on said supporting means with a selected impeller blade in predetermined cutting relation to said cutter, said supporting means being movable to effect the longitudinal traverse of the blade by said cutter; means for moving said supporting means; means supporting said cutter for movement in a plane substantially perpendicular to said one blade; and means for moving said cutter simultaneously with the movement of said impeller supporting means to maintain the predetermined cutting relationship of the cutter and blade as the latter is traversed by the former.

6. Apparatus for machining the edges of curved skewed impeller blades comprising: supporting means for holding an impeller having curved skewed blades with the axis of the impeller extending in a certain direction; means for positioning an impeller on said supporting means with a selected impeller blade in a predetermined location, said supportnig means being movable in two directions in a plane at right angles to the axis of an impeller mounted thereon; a cutter mounted for rotation about an axis; means for rotating said cutter about said axis; supporting means for said cutter and the means for rotating the same, said cutter supporting means being movable to dispose the axis of rotation of said cutter at different angles relative to said selected impeller blade; means for moving said impeller supportnig means in said two directions to effect the longitudinal traverse of the blade by said cutter; and motion transmitting means between said impeller supporting means and said cutter supporting means for moving the latter simultaneously with the former to maintain a predetermined angular relationship of the cutter with the skewed blade at the portion being machined as the cutter traverses said blade.

7. Apparatus for machining the edges of a curved skewed blade comprising: a frame; carriage means disposed on said frame for movement in two directions at right angles to one another in a predetermined plane; means on said carriage for supporting a skewed blade to be machined, the blade being held with the edge to be machined in a second plane parallel to said predetermined plane; cutter supporting means mounted in said frame for rocking movement about an axis disposed in said second plane, said axis extending through a selected point on the edge of the blade held in said supporting means; a cutter mounted on said supporting means for rotation about a second axis disposed in a plane extending at right angles to the first mentioned axis, said second axis being disposed to extend the cutting edge of said cutter through the selected point on said blade; means for rotating said cutter; and means for simultaneously moving said carriage means and said cutter supporting means to maintain a predetermined angular cutting relationship of cutter and blade while the blade is traversed by the cutter.

References Cited in the file of this patent
UNITED STATES PATENTS

| | | |
|---|---|---|
| 2,135,639 | Gorham | Nov. 8, 1938 |
| 2,375,114 | Kylin | May 1, 1945 |
| 2,660,930 | De Vlieg et al. | Dec. 1, 1953 |
| 2,674,160 | Martellotti | Apr. 6, 1954 |
| 2,782,691 | Feagans | Feb. 26, 1957 |
| 2,784,648 | Von Zelewsky | Mar. 12, 1957 |